United States Patent [19]

Feider

[11] Patent Number: 5,180,070

[45] Date of Patent: Jan. 19, 1993

[54] DIRECTIONAL CONTROL SYSTEM FOR A GANTRY TYPE CRANE

[75] Inventor: Thomas H. Feider, Sturgeon Bay, Wis.

[73] Assignee: Shuttelift, Inc., Sturgeon Bay, Wis.

[21] Appl. No.: 708,901

[22] Filed: May 30, 1991

[51] Int. Cl.⁵ .............................................. B66C 5/02
[52] U.S. Cl. .................................. 212/218; 180/140
[58] Field of Search ............... 212/218, 219; 180/233, 180/234, 242, 305, 140

[56] References Cited

U.S. PATENT DOCUMENTS

| | | | |
|---|---|---|---|
| 3,059,782 | 10/1962 | Baudhuin | 212/218 |
| 3,161,309 | 12/1964 | Baudhuin et al. | 212/218 |
| 3,314,690 | 4/1967 | Bunchak | 180/234 |
| 3,972,379 | 8/1976 | Norris | 180/234 |
| 4,378,072 | 3/1983 | Appleman et al. | 212/218 |
| 4,457,389 | 7/1984 | Voelz | 180/140 |
| 4,880,124 | 11/1989 | Feider et al. | 180/140 |

Primary Examiner—Jesus D. Sotelo
Assistant Examiner—Stephen P. Avila
Attorney, Agent, or Firm—Wallenstein, Wagner & Hattis, Ltd.

[57] ABSTRACT

A directional control system for a gantry type cane operable in either a longitudinal direction or a transverse direction is disclosed. The gantry type crane has first and second, spaced front wheels and first and second, spaced rear wheels. The first front wheel and the first rear wheel are on one longitudinal side of the crane, and the second front wheel and the second rear wheel are on the other longitudinal side of the crane. The control system cooperatively rotates the first and second front wheels for controlling the direction of travel of the crane in the longitudinal direction, and cooperatively rotates the first front wheel and the first rear wheel for controlling the direction of travel of the crane in the transverse direction. Thus the wheels positioned perpendicular to the direction of travel provide the steering.

6 Claims, 6 Drawing Sheets

FIG. 7

DIRECTIONAL CONTROL SYSTEM FOR A GANTRY TYPE CRANE

TECHNICAL FIELD

Applicant's invention relates to a directional control system for a gantry type crane operable in both a longitudinal and a transverse direction and, more particularly, to a directional control system which permits greater maneuverability in the transverse direction.

BACKGROUND PRIOR ART

Mobile, gantry-type cranes are well known for lifting and moving large bulky objects such as shipping containers, heavy machinery, boats, or the like. Typically such mobile cranes must have sufficient maneuverability both to position themselves over the object to be lifted, as well as to place the object at its desired location. For example, such cranes must be able both to move longitudinally up and down an isle, as well as to move transversely between isles.

Voelz, U.S. Pat. No. 4,457,389, discloses a mobile gantry type crane providing both longitudinal, as well as transverse, movement. However, there is no directional control in the transverse direction.

Marine Travelift, assignee of this application, developed a directional control system for a gantry crane which provided limited directional control in the transverse direction. The crane has four spaced apart wheels, specifically a right-front wheel RF, a left-front wheel LF, a right-rear wheel RR and a left-rear wheel LR, as defined with respect to movement in the longitudinal direction. When moving in the longitudinal direction, steering wa accomplished by conventionally rotating the right-front RF and left-front LF wheels. The right-rear RR and left-rear LR wheels remained fixed. When switching from movement in the longitudinal direction to movement in the transverse direction, all four wheels (RF, LF, RR, LR) were rotated 90°. Once all four wheels were rotated 90°, the right-rear RR and the left-rear LR wheels, which were now, in effect, the two right-side wheels with respect to movement in the transverse direction, could be rotated ± 5° by means of a separate tiller control. This system provided maneuverability in the transverse direction. However, because steering was being accomplished by a side pair of wheels rather that a front pair of wheels, there was a tendency for the wheels not to properly track, resulting in increased tire wear. Further, the separate tiller control for transverse steering made control difficult.

The present invention is provided to solve these and other problems.

SUMMARY OF THE INVENTION

It is an object of the invention to provide a directional control system for a gantry type crane operable in either a longitudinal direction, wherein the wheels positioned perpendicular to the direction of travel provide the steering for the crane.

In accordance with the invention, the gantry type crane has first and second, spaced front wheels and first and second, spaced rear wheels. The first front wheel and the first rear wheel are on one longitudinal side of the crane, and the second front wheel and the second rear wheel are on the other longitudinal side of the crane. The control system cooperatively rotates the first and second front wheels for controlling the direction of travel of the crane in the longitudinal direction, and cooperatively rotates the first front wheel and the first rear wheel for controlling the direction of travel of the crane in the transverse direction.

Other features and advantages of the invention will be apparent from the following specification taken in conjunction with the following drawing.

DETAILED DESCRIPTION

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

Figure 1:
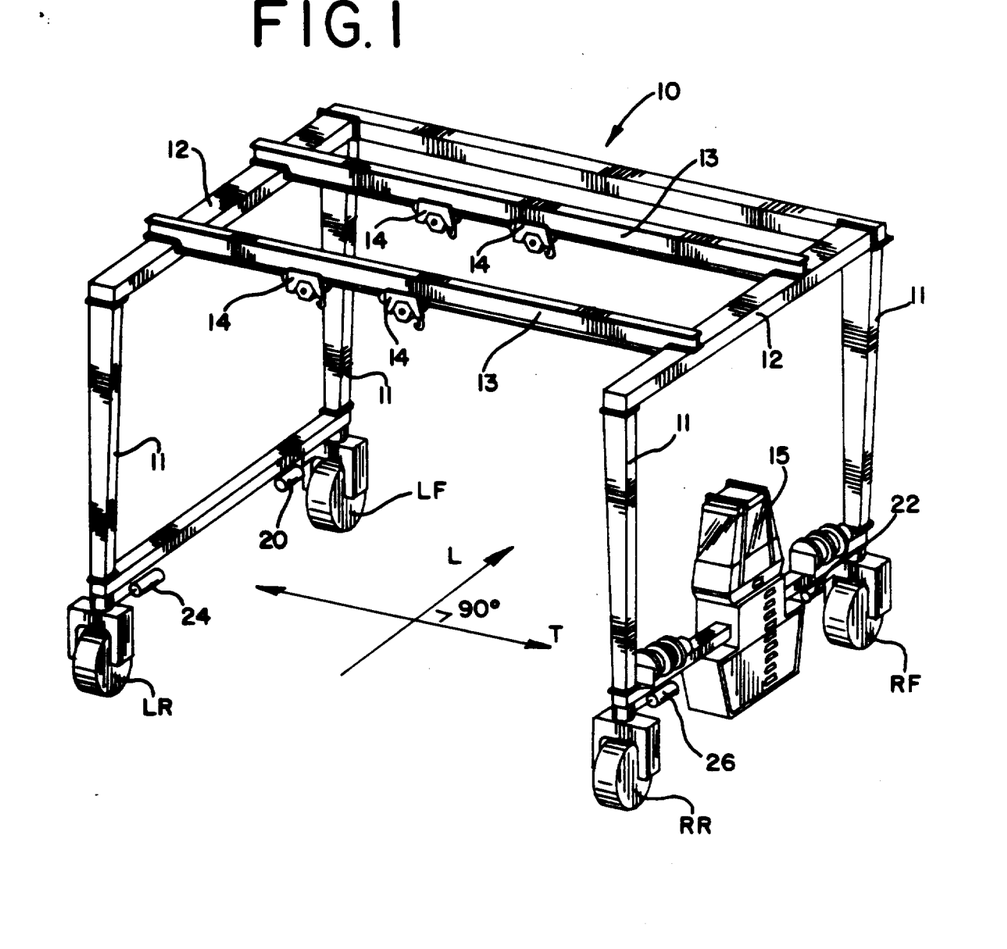
FIG. 1 is a perspective view of a crane incorporating the control system in accordance with the present invention.

A gantry type crane 10 to which the invention is applicable, is illustrated in FIG. 1. The crane 10 includes four column assemblies 11 supporting a pair of side beams 12. The side beams 12 carry a pair of trolley beams 13, each of which carries a pair of trolley hoists 14. A cab 15 is provided for the crane operator and houses operator controls. The crane 10 is operable in both a conventional, longitudinal direction L and a transverse direction T. The crane 10 includes a left-front wheel LF, a right-front wheel RF, a left-rear wheel LR and a right-rear wheel RR. When traveling in the longitudinal direction L, directional control is conventionally accomplished by cooperatively turning the left-front wheel LF and the right-front wheel RF by operation of a left-front steering cylinder 20 and a right-front steering cylinder 22, respectively. As is well known, because of differing turning radiuses, the left-front wheel LF and the right-front wheel RF do not rotate the same angular amount. For example, when turning the crane 10 to the left, the left-front wheel LF will rotate a greater angular amount than the right-front wheel RF. Similarly, when turning the crane 10 to the right, the right-front wheel RF will rotate a greater angular amount than the left-front wheel LF. As discussed in greater detail below, the crane 10 is also operable in the transverse direction T. To operate in the transverse direction T, each of the left-front wheel LF, the right-front wheel RF, the left-rear wheel LR and the right-rear wheel RR is rotated 90°, as sequentially illustrated in FIGS. 4–6. Rotation of the four wheels LF, RF, LR, RR is accomplished by operation of the left-front steering cylinder 20, the right-front steering cylinder 22, as well as a left-rear transverse steering cylinder 24, a right-rear transverse steering cylinder 26 and a right-front transverse steering cylinder 28. Forward and rearward drive for the crane 10 are provided by a conventional hydraulic drive.

Figure 2:
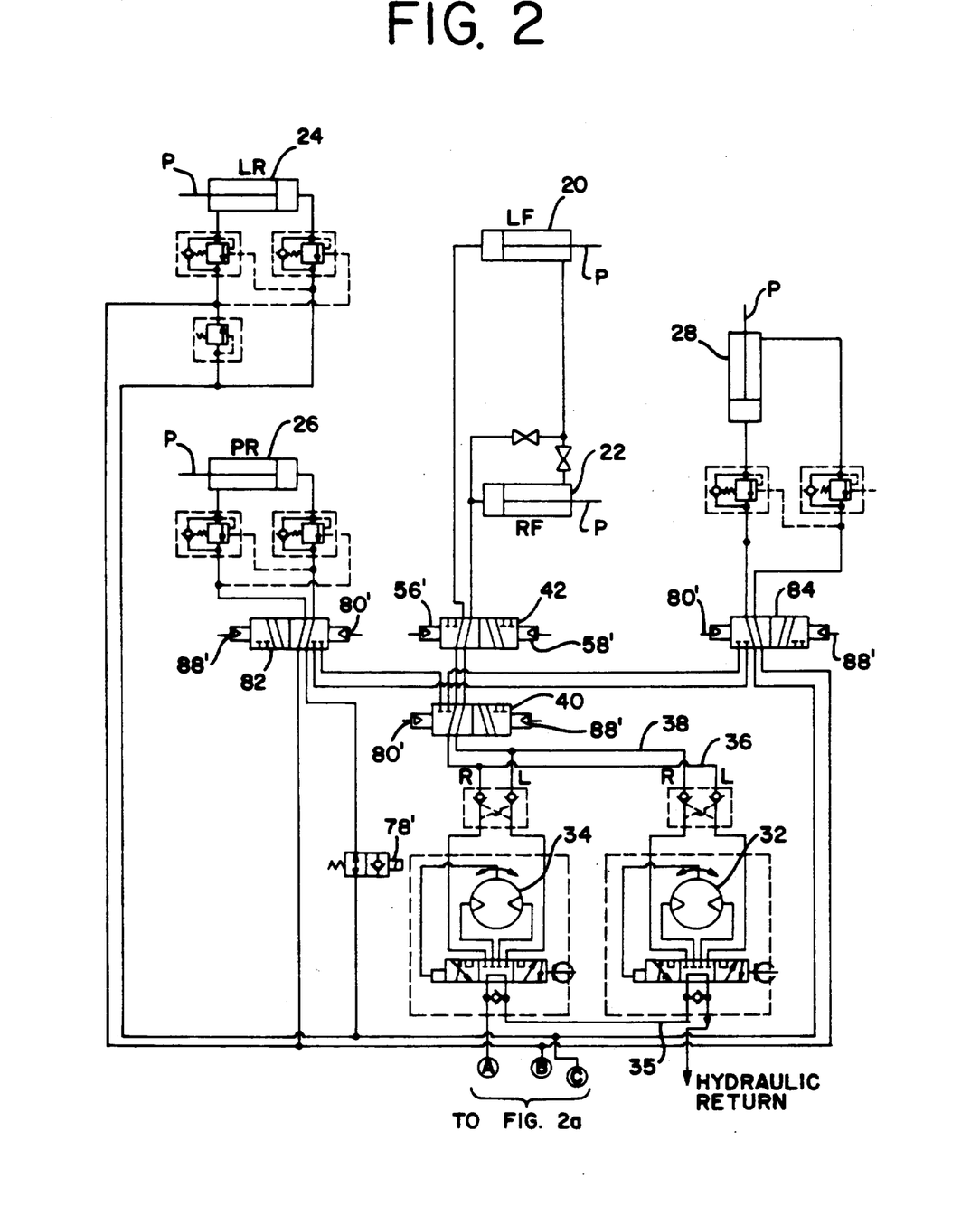
FIGS. 2, 2a and 2b are schematics of a hydraulic system as utilized by the control system.
Figure 3:
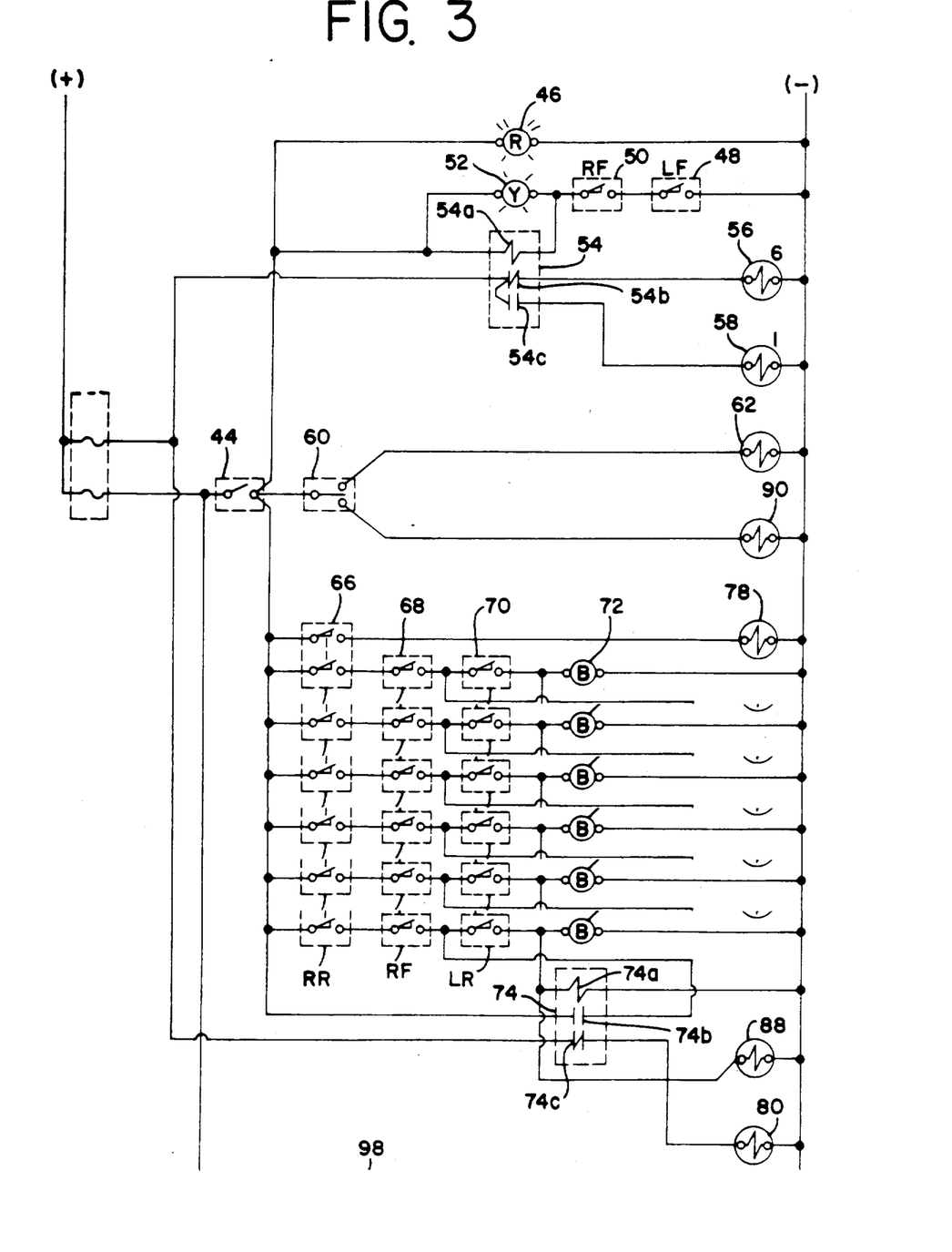
FIG. 3 is a schematic of an electrical circuit as utilized in accordance with the control system.

Hydraulics, generally designated 29, for effecting longitudinal and transverse control are illustrated in FIG. 2. Corresponding electrical control circuitry 30 is illustrated in FIG. 3.

Referring to FIG. 2, conventional front and rear orbitrols 32, 34, well known in the art, are provided for steering control. The front and rear orbitrols 32, 34 are coupled to a respective front and rear steering wheels (not shown). The front and rear steering wheels are conventionally provided in the front and rear of the cab 15 so that the crane operator can face either forward or backwards, as needed. The front and rear orbitrols 32, 34 operate in parallel, and therefore, the following description of operation will be made with respect operation of the front orbitrol 32 with the understanding that the rear orbitrol 34 operates similarly.

Figures 2A, 2B:
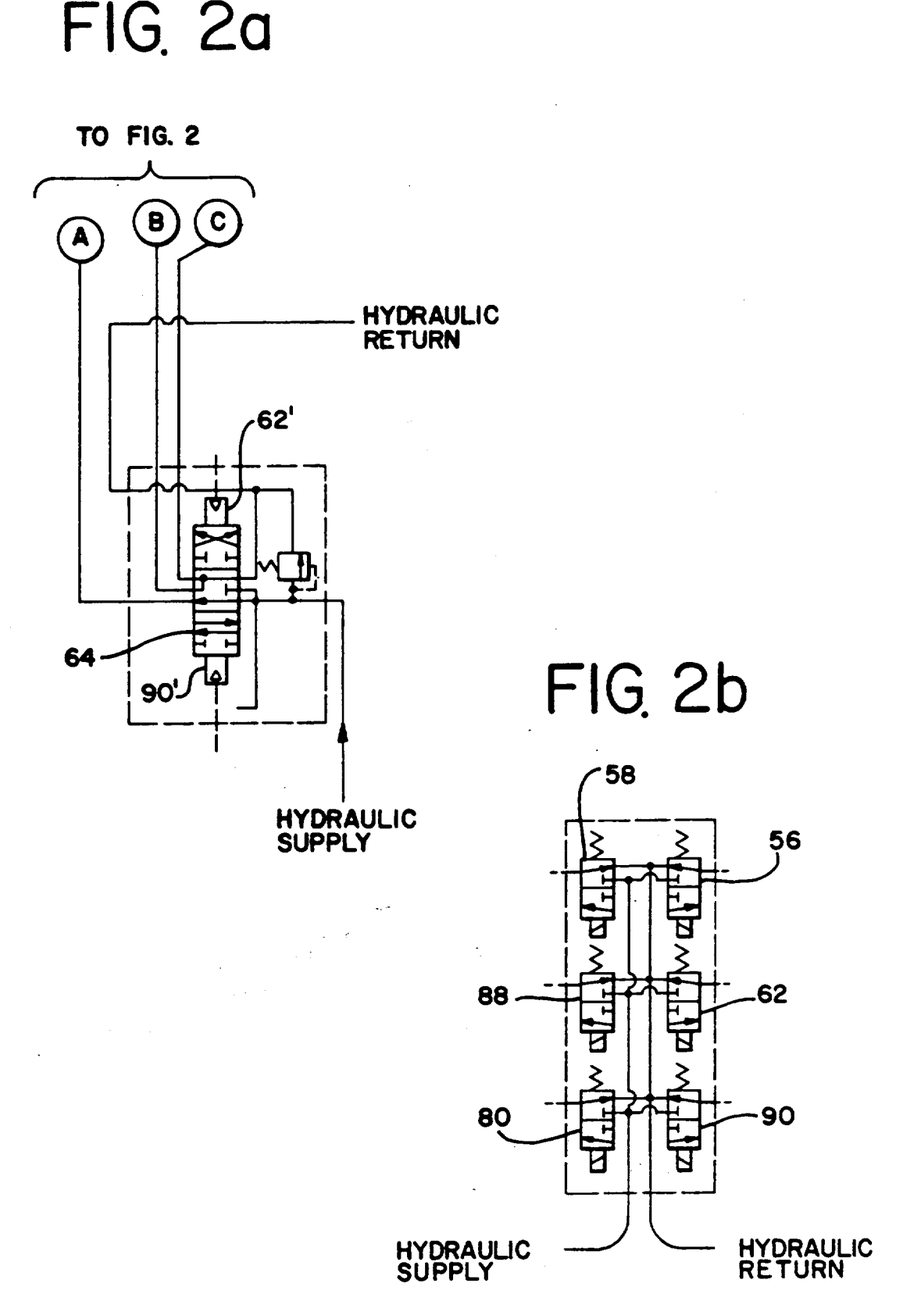

Hydraulic fluid is provided under pressure to the front orbitrol 32 via a hydraulic supply line 35. The front orbitrol 32 permits controlled flow of the hydraulic fluid through left an right hydraulic lines 36, 38, respectively. The left hydraulic line 36 and the right hydraulic line 38 are coupled to the left-front steering cylinder 20 and the right-front steering cylinder 22 by a directional selector valve 40 and a longitudinal selector valve 42. The directional selector valve 40 and the longitudinal selector valve 42 are each operable in either of the two positions in response to solenoid actuators (FIG. 2b), discussed below. The reference number of the particular solenoid actuator, followed by a prime (') is identified adjacent the selector valves.

When the front orbitrol 32 is rotated counterclockwise (as by rotation of the front steering wheel), hydraulic fluid flows through the left hydraulic line 36, through the directional selector valve 40 and the longitudinal selector valve 42. This hydraulic flow extends the piston P of the left-front steering cylinder 20 and retracts the piston P of the right-front steering cylinder 22, thus causing the left-front wheel LF and the right-front wheel RF to rotate to the left, or counterclockwise as viewed from above. Because of differing turning radiuses when making a turn, the left-front wheel LF and the right-front wheel RF do not turn the same angular amount. For example, when turning left, the left-front wheel LF will turn a greater amount than the right-front wheel RF. Similarly, when turning right, the right-front wheel RF will turn further than the left-front wheel LF. This is accomplished by a conventional mechanical linkage well known in the art.

Transition from the longitudinal steering mode to the transverse steering mode will now be explained with reference to FIGS. 2-6.

Figure 4:
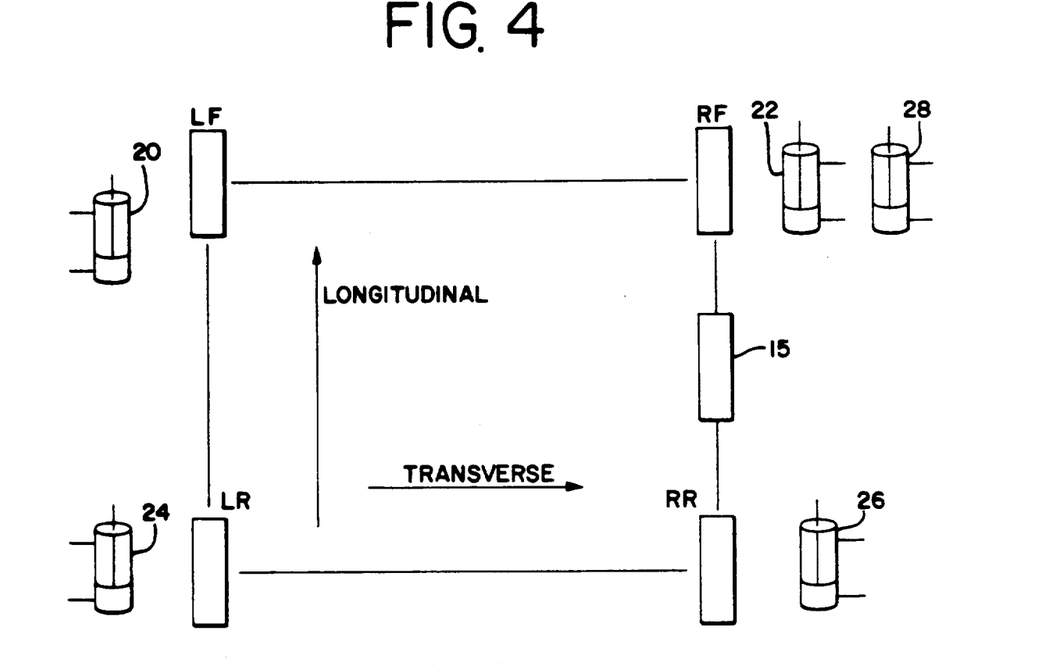
FIGS. 4, 5, 6 and 7 are block representations illustrating various rotational positions of the crane wheels.
Figure 5:
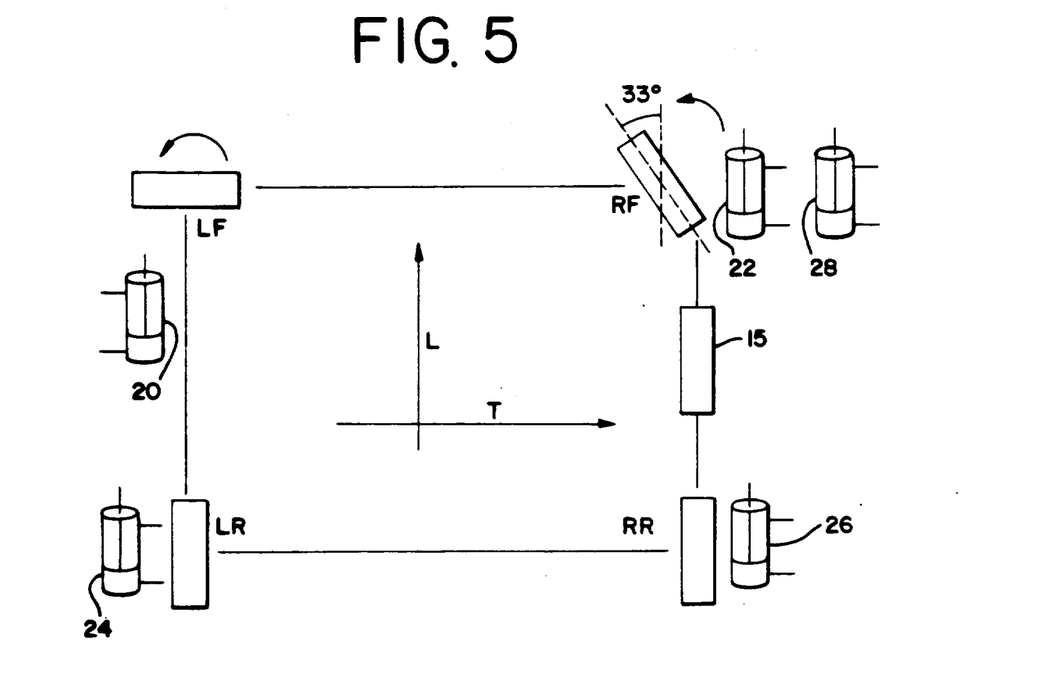

Initially when the crane 10 is operating in the longitudinal steering mode, the four wheels LF, RF, LR, RR are each directed longitudinally, as illustrated in FIG. 4. The control circuitry 30 (FIG. 3) includes a transverse steering selector switch 44. When shifting from the longitudinal steering mode to the transverse steering mode, the transverse steering selector switch 44 is closed, providing power to the remainder of the control circuitry 30 and illuminating a red indicator light 46. The operator then turns the steering wheel (either the front steering wheel or the rear steering wheel) fully counterclockwise to the left until the left-front wheel LF and the right-front wheel RF are rotated to their full leftward extent, as illustrated in FIG. 5. As indicated above, due to differing turning radiuses, the left-front wheel LF and the right-front wheel RF will not have rotated equal angular amounts. Specifically, the left-front wheel LF will have turned a full 90°, while the right-front wheel RF will have turned approximately 33°.

Returning again to FIG. 3, a left-front wheel limit switch 48 is provided which closes when the left-front wheel LF has rotated fully to the left, and a right-front wheel limit switch 50 is provided which closes when the right-front wheel RF is fully rotated to the left (to its full 33° rotation). When the left-front wheel limit switch 48 and the right-front wheel limit switch 50 are both closed, indicating that both the left-front wheel LF and the right-front wheel RF are fully rotated to the left, a yellow indicator light 52 is illuminated, and a first coil 54a of a first relay 54 is energized, opening a first normally closed contact 54b and closing a first normally open contact 54c. The opening of the first normally closed contact 54b and the closing of the first normally open contact 54c de-energizes a first solenoid actuator 56 and energizes a second solenoid actuator 58. The first and second solenoid actuators 56, 58 operate the longitudinal selector 42 valve between either of its two positions, as indicated by reference numbers 56' and 58'. This action causes the longitudinal selector valve 42 (FIG. 2) to move leftwardly, thereby blocking any hydraulic fluid flow to, and hence disabling, the left-front steering cylinder 20 and the right-front steering cylinder 22. Illumination of the yellow light indicates that the crane operator can stop turning the steering wheel to the left.

Figure 6:
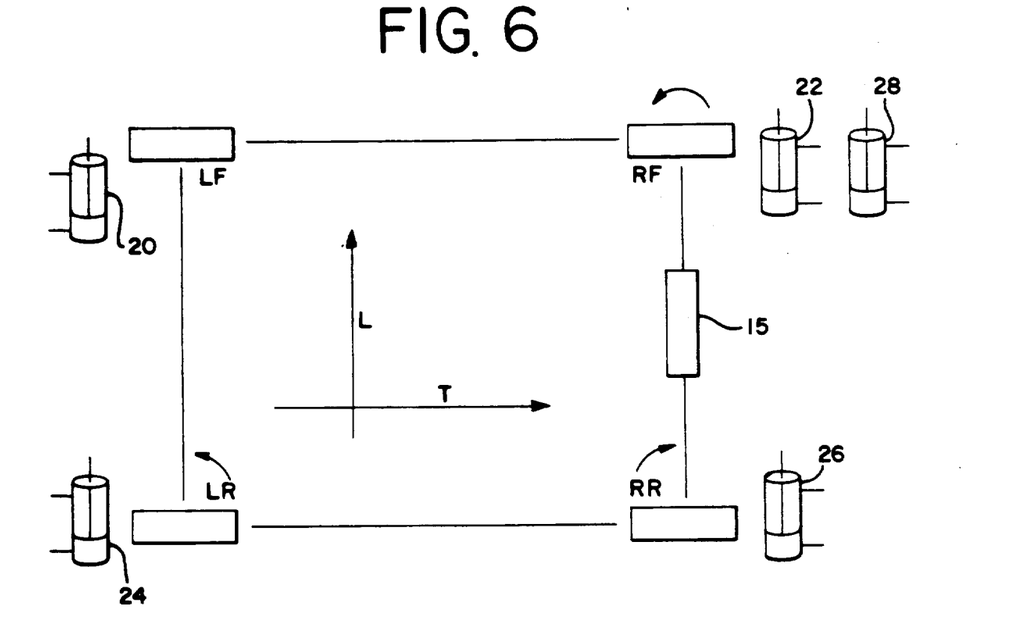

The crane operator then pushes upwardly (with respect to FIG. 3), a contact switch 60, which energizes a third solenoid actuator 62. Energization of the third solenoid actuator moves downwardly a hydraulic directional control valve 64 (FIG. 2a), which causes extension of the piston P of the left-rear transverse steering cylinder 24, the piston P of the right-rear transverse steering cylinder 26 and the piston P of the right-front transverse steering cylinder 28, rotating each of the left-rear wheel LR, the right-rear wheel RR and the right-front wheel RF to their full 90° transverse position, as illustrated in FIG. 6. Limit switches 66, 68, 70 (FIG. 3) cooperate with the right-rear wheel RR, the right-front wheel RF and the left-rear wheel LR, respectively, and close when each of their respective ones of the wheels RR, RF, LR rotate to their full 90° transverse position. Closure of the limit switches 66, 68, 70 illuminates a blue indicator lamp 72, and energizes a second coil 74a of a second relay 74. Energization of the second coil 74a closes a normally open contact 74b and opens a normally closed contact 74c. Closure of the limit switch 6 also energizes a fourth solenoid actuator 78. This operates a solenoid valve 79, which couples the right-rear steering cylinder 26 to the orbitrols 32, 34.

The opening of the normally closed contact 74c opens a fifth solenoid actuator 80, which operates first and second transverse selector valves 82, 84 (FIG. 2). In the transverse mode, steering is accomplished via the front or rear orbitrols 32, 34. The right-rear wheel RR is rotated by actuation of the right-rear transverse steering cylinder 26, and the right-front wheel RF is rotated by actuation of the right-front transverse steering cylinder 28.

When rotating 90° to change from the longitudinal steering mode to the transverse steering mode, each of the left-front wheel LF, the right-front wheel RF, and the left-rear wheel LR rotates counterclockwise, as shown by the arrows in FIGS. 4-6. However, the right-rear wheel RR rotates clockwise, and this is 180° of the other wheels LF, RF, LR. Thus, forward revolution of the right-rear wheel RR would be opposite forward revolution of the other three wheels LF, RF, LR. Closure of the limit switches 66, 68 and 70 also energizes a sixth solenoid actuator 88, which reverses the drive direction of the right-rear wheel RR, so that the right-rear wheel RR revolves in the same direction as the other of the wheels LF, RF, LR.

When operating in the transverse mode, rotation of the right-rear wheel RR and the right-front wheel RF causes intermittent closing and opening of the limit switches 66, 68. Accordingly, closing the second normally open contact 74b also closes a holding circuit around the limit switches 66, 68, to ensure the circuit is maintained while steering in the transverse direction. At that this point the crane 18 is ready to drive in the transverse direction.

Figure 7:
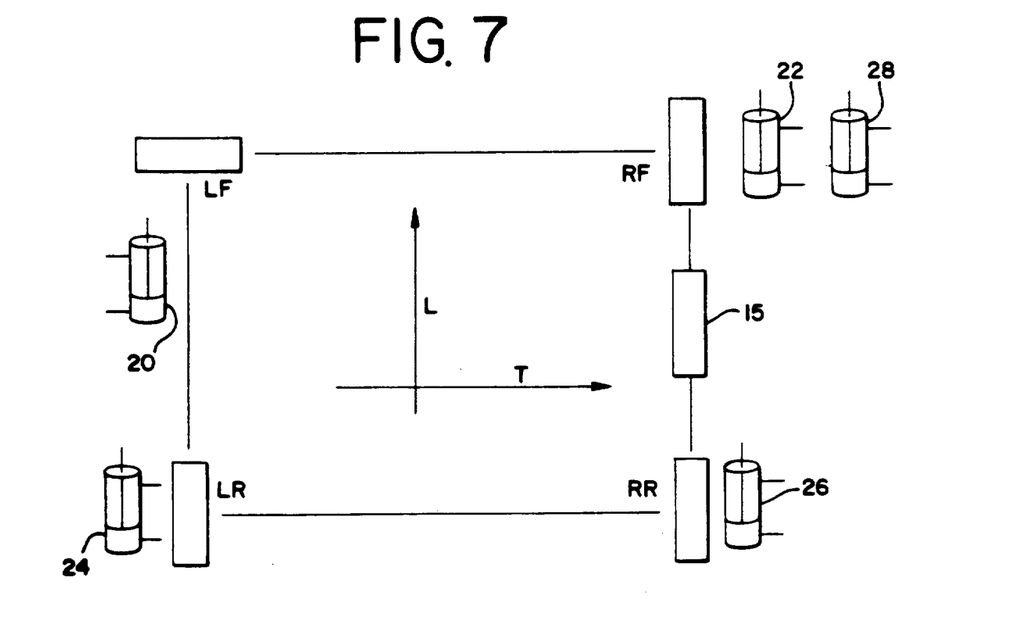

To return the crane 18 to the longitudinal steering mode, the contact switch 60 (FIG. 3) is moved downwardly, denergizing the third solenoid actuator 62 and energizing a seventh solenoid actuator 90 which moves the hydraulic directional control valve 64 to its upwardly position. This returns each of the wheels except for the left-front wheel LF to its respective longitudinal direction, as shown in FIG. 7. Once all of these three wheels RF, RR, LR have rotated to their respective longitudinal position, limit switches 92, 94, 96 are closed, illuminating a green indicator light 98.

Initially after pressing the contact switch 60, the right-rear wheel RR and right-front wheel RF will not turn because the sixth solenoid actuator 88 remains energized, causing the hydraulic directional control valve 64 to continue blocking hydraulic fluid flow to the right-rear wheel RR and the left-front wheel RF. However, fluid flow to the left-rear wheel LR is not blocked, and, accordingly, the left-rear wheel LR will begin to rotate. This rotation of the left-rear wheel LR opens the limit switch 70, which de-energizes the solenoid actuator 88 and de-energizes the second relay 74. De-energizing the second relay 74 closes the normally closed contact 74c of the second relay 74, switching the hydraulic selector valves that allow the right-rear wheel RR and right-front wheel RF to rotate. The crane 18 is now ready for longitudinal operation.

It will be understood that the invention may be embodied in other specific forms without departing from the spirit or central characteristics thereof. The present embodiment therefore, is to be considered in all respects as illustrative and not restrictive, and the invention is not to be limited to the details given herein.

I claim:

1. A directional control system for a gantry type crane, said gantry type crane operable in either a longitudinal direction or a transverse direction, said gantry type crane further having a pair of front wheels and a pair of rear wheels as defined with respect to said longitudinal direction, said control system comprising:

means for pivotally positioning said pair of front wheels and said pair of rear wheels alternatively between either a longitudinal direction or a transverse direction;

longitudinal steering means for cooperatively rotating said pair of front wheels to provide longitudinal steering when said pairs of wheels are directed substantially in said longitudinal direction; and transverse steering means for cooperatively rotating one of said front wheels and an adjacent one of said rear wheels to provide transverse steering when said pairs of wheel are directed substantially in said transverse direction.

2. The directional control system of claim 1 wherein said first and second pivoting means comprises hydraulic cylinders.

3. The directional control system of claim 1 wherein said transverse steering means rotates said one of said front wheels and an adjacent one of said rear wheels ± 5.

4. The directional control system of claim 1 including a common steering wheel for operating said longitudinal steering means and said transverse steering means.

5. A directional control system for a gantry type crane operable in either a longitudinal direction or a transverse direction, said gantry type crane having first and second, spaced front wheels and first and second, spaced rear wheels, said first front wheel and said first rear wheel being on one longitudinal side of said crane and said second front wheel and said second rear wheel being on the other longitudinal side of said crane, said control system comprising:

means for cooperatively rotating said first and second front wheels for controlling the direction of travel of said crane in the longitudinal direction; and means for cooperatively turning said first front wheel and said first rear wheel for controlling the direction of travel of said crane in the transverse direction.

6. A directional control system for a gantry type crane operable in either a longitudinal direction or a transverse direction, said gantry type crane having first and second, spaced front wheels and first and second, spaced rear wheels, said first front wheel and said first rear wheel being on one longitudinal side of said crane and said second front wheel and said second rear wheel being on the other longitudinal side of said crane, said control system comprising:

a first hydraulic cylinder operatively coupled to said first front wheel;

a second hydraulic cylinder operatively coupled to said second front wheel;

a third hydraulic cylinder operatively coupled to said first rear wheel;

a fourth hydraulic cylinder operatively coupled to the second rear wheel;

a fifth hydraulic cylinder operatively coupled to said first front wheel;

means for cooperatively actuating said first and second hydraulic cylinders for steering said crane in said longitudinal direction; and means for cooperatively actuating said third and fifth hydraulic cylinders for steering said crane in said transverse direction.

* * * * *

UNITED STATES PATENT AND TRADEMARK OFFICE
CERTIFICATE OF CORRECTION

PATENT NO. : 5,180,070

DATED : January 19, 1993

INVENTOR(S) : Thomas H. Feider and Norbert W. Lenius

It is certified that error appears in the above-indentified patent and that said Letters Patent is hereby corrected as shown below:

Title page, item [57]:

<u>IN THE ABSTRACT:</u>
Line 1, after "type" delete "cane" and substitute --crane--.

Col. 1, line 34, after "steering" delete "wa" and substitute --was--.

Col. 3, line 18, after "left" delete "an" and substitute --and--.

Col. 6, line 16, delete "5" and insert --5°--.

<u>IN THE DRAWINGS:</u>
Delete Figure 3 and substitute therefor Figure 3 as shown on the attached page.

Signed and Sealed this

Nineteenth Day of July, 1994

Attest:

BRUCE LEHMAN

*Attesting Officer*   *Commissioner of Patents and Trademarks*

FIG. 3